United States Patent [19]

Phelps et al.

[11] 4,021,049

[45] May 3, 1977

[54] ADJUSTABLE LIP TYPE SEAL FOR A CRANKSHAFT

[75] Inventors: Elmer B. Phelps, Creve Coeur; Allen J. Friede, Peoria, both of Ill.

[73] Assignee: Caterpillar Tractor Co., Peoria, Ill.

[22] Filed: Dec. 15, 1975

[21] Appl. No.: 640,512

[52] U.S. Cl. .................................. 277/11; 277/153
[51] Int. Cl.² .......................................... F16J 15/16
[58] Field of Search ................ 277/187, 152, 9, 51, 277/153, 11, 193

[56] References Cited

UNITED STATES PATENTS

| | | |
|---|---|---|
| 2,181,203 | 11/1939 | Reynolds ............................ 277/189 |
| 2,264,413 | 12/1941 | Siegrist ............................ 277/187 X |
| 2,990,220 | 6/1961 | Malone ............................ 277/187 X |
| 3,179,423 | 4/1965 | McCloud ............................ 277/30 |
| 3,545,771 | 12/1970 | Downing ............................ 277/187 |
| 3,595,585 | 7/1971 | Bristow ............................ 277/58 |
| 3,773,336 | 11/1973 | Walter et al. ............................ 277/187 |
| 3,866,813 | 2/1975 | Arnold ............................ 277/9 |
| 3,917,286 | 11/1975 | Loyd ............................ 277/187 X |

Primary Examiner—Richard E. Aegerter
Assistant Examiner—L. Footland
Attorney, Agent, or Firm—Phillips, Moore, Weissenberger, Lempio & Majestic

[57] ABSTRACT

A lip seal assembly provides an axially adjustable seal between a rotating shaft, such as a crankshaft, and a stationary housing, such as an engine block. The assembly includes a generally ring shaped retainer circumscribing the shaft and having a hollow, cylindrical cavity therein which receives a slidably positioned lip seal mounting member. A plurality or ring shaped spacer gaskets enable the lip seal to be axially adjusted within the cavity such that the point of engagement of the lip seal with a running surface of the shaft may be changed.

10 Claims, 2 Drawing Figures

ADJUSTABLE LIP TYPE SEAL FOR A CRANKSHAFT

BACKGROUND OF THE INVENTION

This invention relates to a rotary seal assembly which provides a dynamic seal with respect to a rotating shaft such as a crankshaft. More particularly, it relates to a lip seal assembly which is adjustable axially along such shaft.

Rotary seals, such as those used on the ends of crankshafts, often fail prematurely due to the rubbing action which occurs between the seal face and the running surface of the shaft at the line of contact. This rubbing action causes the wearing off of the seal face as well as the wearing of a groove into the shaft. Consequently, sealing effectiveness is considerably reduced. This problem is particularly severe when the shaft and seal are exposed to an environment having abrasive particles which tends to increase the wear rate. This leads to frequent replacement of the seal.

In addition, after sufficient wear has occurred to cause leakage past the seal, the crankshaft is normally removed from the engine and the shaft running surface reground in order to eliminate the groove worn therein by the seal. The crankshaft is then subsequently reassembled with a new seal.

U.S. Pat. No. 3,595,585 proposes a method for overcoming this problem. The subject patent describes the utilization of a rotary seal assembly which is removed from the shaft and axially reversed and remounted, such that the seal face is repositioned in a new location on the running surface of the shaft. However, problems exist with this method in that only a single additional wear location is thus provided. Another proposal is that found in U.S. Pat. No. 3,866,813, assigned to the assignee hereof. In that patent, an adapter and retainer are threadably coupled such that selective rotation of one with respect to the other permits the axial location of the retainer carrying a lip seal to be changed. While this does provide for a large number of positions along the shaft surface structure, it is relatively complex and costly.

SUMMARY AND OBJECTS OF THE INVENTION

The present invention relates to a rotary seal assembly for providing a dynamic seal between a rotating shaft and a stationary housing. The assembly includes a retainer having a generally cylindrical cavity therein, which cavity slidably contains a ring shaped seal retainer mounting a lip type seal. A plurality of generally ring shaped spacer gaskets allows the ring shaped seal retainer to be selectively positioned within the cavity and consequently provides a new point of contact between the lip seal and the shaft. The lip seal and retainer are held in contact with the spacer gaskets within the cavity by means of a ring shaped seal retainer which is bolted to the retainer by means of a plurality of bolts. By removing the bolts and ring shaped seal retainer and rearranging the seal gaskets in relation to the seal retainer, axial adjustment of the lip seal which is carried by the seal retainer to a new location on the running surface of the shaft is thus provided. In this manner, shaft wear may be distributed over a greater portion of the shaft length, thereby increasing the life of the shaft.

It is therefore the primary object of this invention to provide an axially adjustable seal which may be selectively positioned along a shaft.

It is a further object of this invention to provide a means for axially adjusting a lip seal along a shaft to a plurality of locations, thereby increasing the life of the shaft.

Other objects and advantages of this invention will become more readily apparent by having reference to the following description and accompanying drawings.

DETAILED DESCRIPTION

Figure 1:
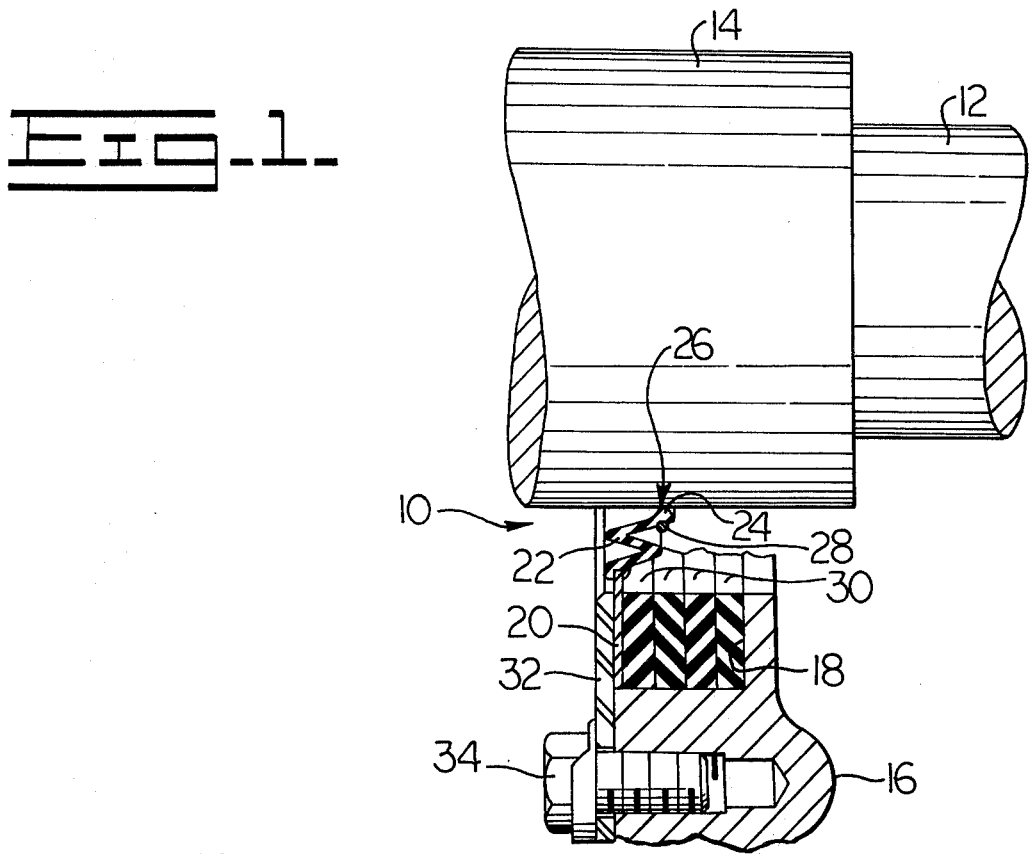
FIG. 1 is a longitudinal sectional view of a rotating seal assembly according to the present invention; and, FIG. 2 is a similar view of the same, showing the seal axially adjusted to a new position.

Referring now to FIG. 1, there is shown a rotary seal assembly generally at 10 in association with a shaft such as a crankshaft 12. The crankshaft is stepped to form a crankshaft portion 14. The crankshaft is mounted within an engine block (not shown) by means of a plurality of sleeve type bearings (not shown).

Seal assembly 10 includes a generally ring shaped retainer 16 which is mounted within the engine block by means (not shown). On the radially innermost portion of retainer 16 is located a generally cylindrical hollow cavity 18. Slidably located within the cavity is a generally ring shaped seal mounting ring 20. Seal mounting ring 20 in turn mounts a lip type seal 22 having a lip portion 24 bearing against crank shaft portion 14 on a line of contact 26.

Lip seal 22 may conveniently be of resilient rubber material and is generally ring shaped in configuration, having a serpentine curve shown. A metal retainer ring 28 circumscribes the lip seal at a point radially inward of a lip portion 24 in the usual manner.

As shown in FIG. 1, the seal mounting ring is contained between a plurality of equally sized and shaped ring shaped gaskets 30 and a similarly ring shaped seal retainer 32. Ring shaped seal retainer 32 is in turn mounted to retainer 16 by a plurality of bolts, one of which is shown at 34. The bolts are mounted in a bolt circle around ring shaped retainer 16. In this manner, seal mounting ring 20 is effectively held in position.

Figure 2:
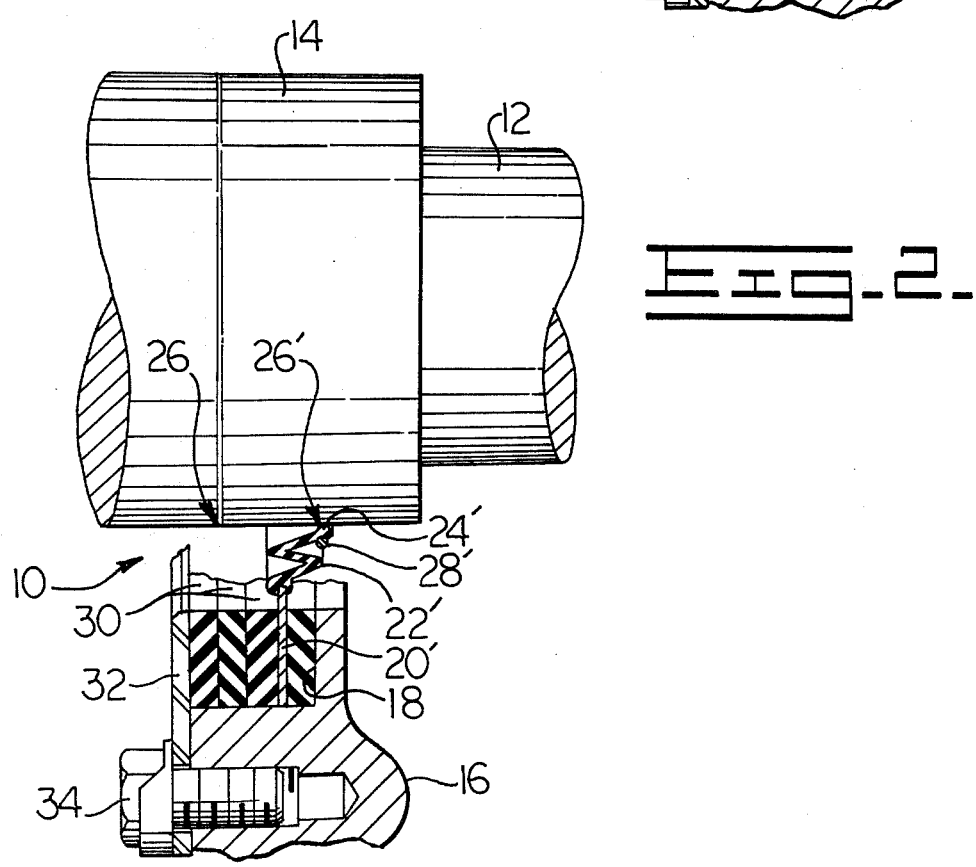

In operation, prolonged rotation of crankshaft 12 will cause lip seal 22 to wear a groove into the surface of the crankshaft portion 14 along line of contact 26. When this occurs, the effectiveness of the seal deteriorates to a point where the lubricating fluid contained in the engine block (not shown) will leak past the seal in a deleterious manner. To overcome this leakage, lip seal 22 can be axially moved so that the point of contact will run on an unworn portion of the crankshaft 26' as seen in FIG. 2. This is accomplished by removing bolts 34 and by removing seal mounting ring 20 and lip seal 22 attached thereto. Several of the spacer gaskets 30 are then removed and mounting ring 20, together with lip seal 22, is positioned within the cavity as shown at 20', 22' in FIG. 2. The removed gaskets are then replaced so that the line of contact of the lip seal is at 26'. Bolts 34 are again used to secure ring shaped seal retainer 32 against the stack of gaskets 30. In this manner the seal is again locked into a new position.

It is to be understood that the number of new positions is determined by the number and thickness of the gaskets. While equally sized gaskets are shown, unequally sized gaskets can also be used to provide a more random placement of the seal contact surface.

It is to be understood that the foregoing description is merely illustrative of a preferred embodiment of the invention, and that the scope of the invention is not to be limited thereto but is to be determined by the scope of the appended claims.

What is claimed is:

1. A lip seal providing an axially adjustable seal on a running surface of a shaft comprising
    a generally ring shaped retainer circumscribing said shaft,
    a hollow cylindrical cavity within said retainer,
    a generally ring shaped seal mounting member slidably positioned within said cavity,
    a lip seal mounted on said seal mounting member in contacting relation with said shaft,
    a plurality of separate and distinct ring shaped spacer members in said cavity which are separable so that said seal mounting member may be selectively positioned between different ones of said plurality of spacer members, thereby allowing axial adjustment of the point of engagement of the lip seal with the running surface of the shaft,
    a ring shaped spacer retainer retaining said seal mounting member and said spacer members within said cavity, and
    mounting means mounting said spacer retainer on said retainer.

2. The invention of claim 1 wherein said cavity is defined by a radially directed wall and an axially directed wall in said retainer and said spacer retainer, and wherein said spacers are dimensioned so as to substantially fill said cavity.

3. The invention of claim 2 wherein said spacers are of equal size.

4. The invention of claim 2 wherein said spacers are of resilient material.

5. The invention of claim 4 wherein said resilient material is rubber.

6. The invention of claim 1 wherein said lip seal is a generally ring shaped member of resilient material.

7. The invention of claim 6 wherein said resilient material is rubber.

8. The invention of claim 6 wherein said lip seal further includes a lip portion contacting said shaft and a retainer ring backing up said lip portion.

9. The invention of claim 8 wherein said retainer ring is of metal material.

10. The invention of claim 1 wherein said mounting means comprises bolt means passing through said spacer retainer.

* * * * *

UNITED STATES PATENT OFFICE
CERTIFICATE OF CORRECTION

Patent No. 4,021,049    Dated May 3, 1977

Inventor(s) Elmer B. Phelps, et al

It is certified that error appears in the above-identified patent and that said Letters Patent are hereby corrected as shown below:

Abstract, line 7, "or" should be --of--.

Signed and Sealed this

Sixth Day of June 1978

[SEAL]

Attest:

RUTH C. MASON
Attesting Officer

DONALD W. BANNER
Commissioner of Patents and Trademarks